Dec. 31, 1929.     W. H. COLES     1,741,557
LAWN SPRINKLER
Filed Feb. 9, 1922
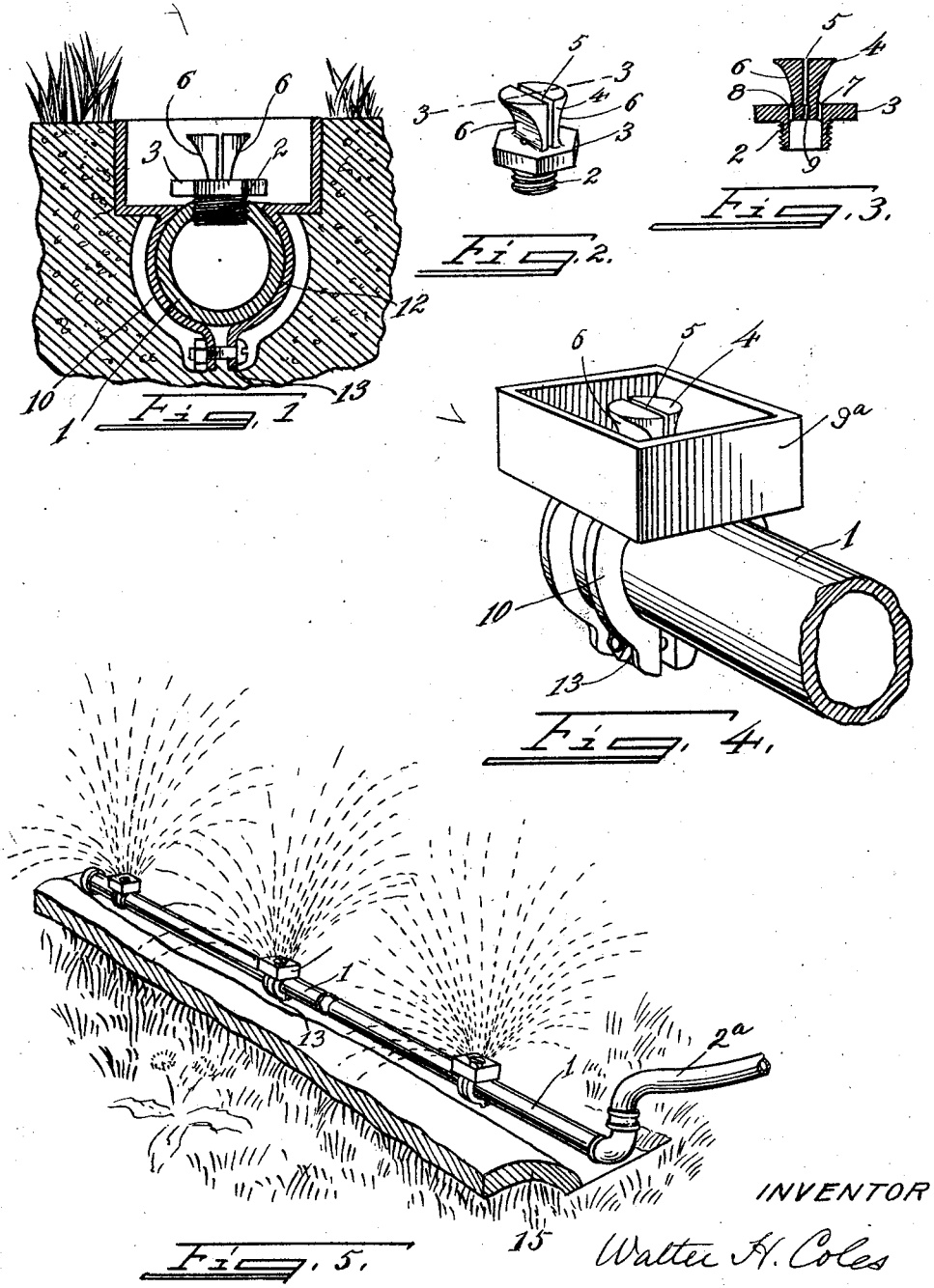
INVENTOR:
Walter H. Coles
BY Allen & Allen
ATTORNEYS.

Patented Dec. 31, 1929

1,741,557

UNITED STATES PATENT OFFICE

WALTER H. COLES, OF TROY, OHIO, ASSIGNOR TO THE SKINNER IRRIGATION COMPANY, OF TROY, OHIO, A CORPORATION OF OHIO

LAWN SPRINKLER

Application filed February 9, 1922. Serial No. 535,392.

The object of my invention is to provide a construction of pipes and nozzles which may be permanently embedded in the surface of the lawn and shall be adapted to sprinkle the lawn uniformly, with fine sprays distributed uniformly in all directions, and in which the nozzles shall be properly protected from destruction or damage from lawn mowers or other objects moving over the surface.

The invention consists of that certain novel construction of nozzle and holder to be particularly point out and claimed, whereby the above object is attained.

In the drawings,

Figure 1 is a cross section of improvements in place in the ground.

Figure 2 is a perspective view of one of the nozzles.

Figure 3 is a central section of same on the line 3, 3, of Figure 2.

Figure 4 is a perspective view of the nozzle as attached to the water pipe.

Figure 5 is a perspective view of a section of the pipe and nozzles as embedded in the lawn.

A number of suitable pipes 1 are laid in the lawn, preferably parallel to each other, a proper distance apart, to accomplish the desired result of uniform distribution. These pipes will be supplied with suitable hose couplings 2ª for the attachment of a hose from the water supply or to connect to a permanent feeder, preferably under ground.

Nozzles of special construction are supplied for these pipes, preferably located about six feet apart. These nozzles comprise a hollow screwthreaded body portion 2 with a head 3 in the shape of a nut to facilitate securing the nozzles in screwthreaded openings in the pipe. Projecting upwardly from the head and preferably integral therewith is a spray forming member 4, preferably cylindrical in shape and provided with a central slot 5 with opposite parts of the cylindrical surface on each side of the slot cut away to form deflecting surfaces 6, 6, forming an overhanging portion on each side of the slot and with these surfaces preferably sections of a sphere. There are three small holes 7, 8, and 9 drilled through the nut. One of these holes opens into the center of the slot 5 at the bottom and is drilled preferably at a slight angle so as to direct the water against one of the walls of the slot, while the other two holes are drilled to direct the stream against the deflecting sides 6, 6, of the spray portion of the nozzle. The result of this is that the streams of water issuing through the nozzle are spread out into fan-like sprays which cover uniformly a considerable extent of surface. The distance apart of the nozzles is regulated for normal water pressure, and as I have indicated is about six feet.

In order that the nozzles may be protected from damage when the spray pipes are located in the ground, I protect each nozzle by a casing or box, open at the top so as not to interfere with the spray. This casing comprises a four-sided box 9ª, open at the bottom to fit on the pipe around the nozzle and provided with a split band 10, 12, adapted to be sprung over the pipe and secured in place by a screw bolt 13. This casing completely surrounds the nozzle and extends preferably slightly above the level of the top of the nozzle, so as to protect the nozzle from being broken off by a lawn mower or otherwise.

The pipes with their nozzles, as I have said, are embedded in the top surface of the lawn to be sprinkled. The sod 15 (Figure 5) is turned back and the pipes laid in place and the sod is then laid back and pressed around the pipes and around the boxes containing the nozzles. In this way the sprinkler is effectively concealed from view.

I have found this construction to be exceedingly effective for keeping a lawn thoroughly watered and fresh and green, even in the hottest weather.

The most effective position for the nozzles is, I believe, as illustrated, with the slots of the nozzles disposed lengthwise of the pipe, although the slots can be turned in other directions if desired.

Having thus described my invention, what I claim as new and desire to secure by Letters Patent, is:—

1. In a lawn sprinkling device, a water supply pipe provided with a nozzle having spray-forming portions, comprising lateralally deflecting walls and a central spreading wall with means to direct jets of water against the three surfaces to form fan-like sheets of spray extending upwardly and laterally from the nozzle.

2. In a lawn sprinkling device, a water supply pipe provided with a nozzle having spray forming portions, comprising a body portion having a central vertical slot with its side cut away to form lateral deflecting surfaces, and means to direct jets of water into the slotted portion and against the deflecting portions to form fanlike sheets of spray.

3. A nozzle for lawn sprinkling, comprising a hollow screwthreaded portion and a spray forming portion projecting above the screwthreaded portion, cylindrical in shape with a central vertical slot and cut away on each side of the slot to form deflecting side walls with openings from the hollow portion to direct jets of water into said slot and against said walls to form sheets of spray.

4. In a lawn sprinkler, a water supply pipe provided with a spray forming device provided with means for projecting water in three fan shaped planes, one vertical, and the other two on respective sides of said vertical spray, said means including a series of deflector surfaces symmetrically arranged with respect to the spray-forming device.

5. In a lawn sprinkling device, a nozzle comprising means for projecting fan shaped sprays laterally directed from the nozzle, and other means for directing a fan shaped spray between the said laterally directed sprays.

WALTER H. COLES.